United States Patent Office 3,503,848
Patented Mar. 31, 1970

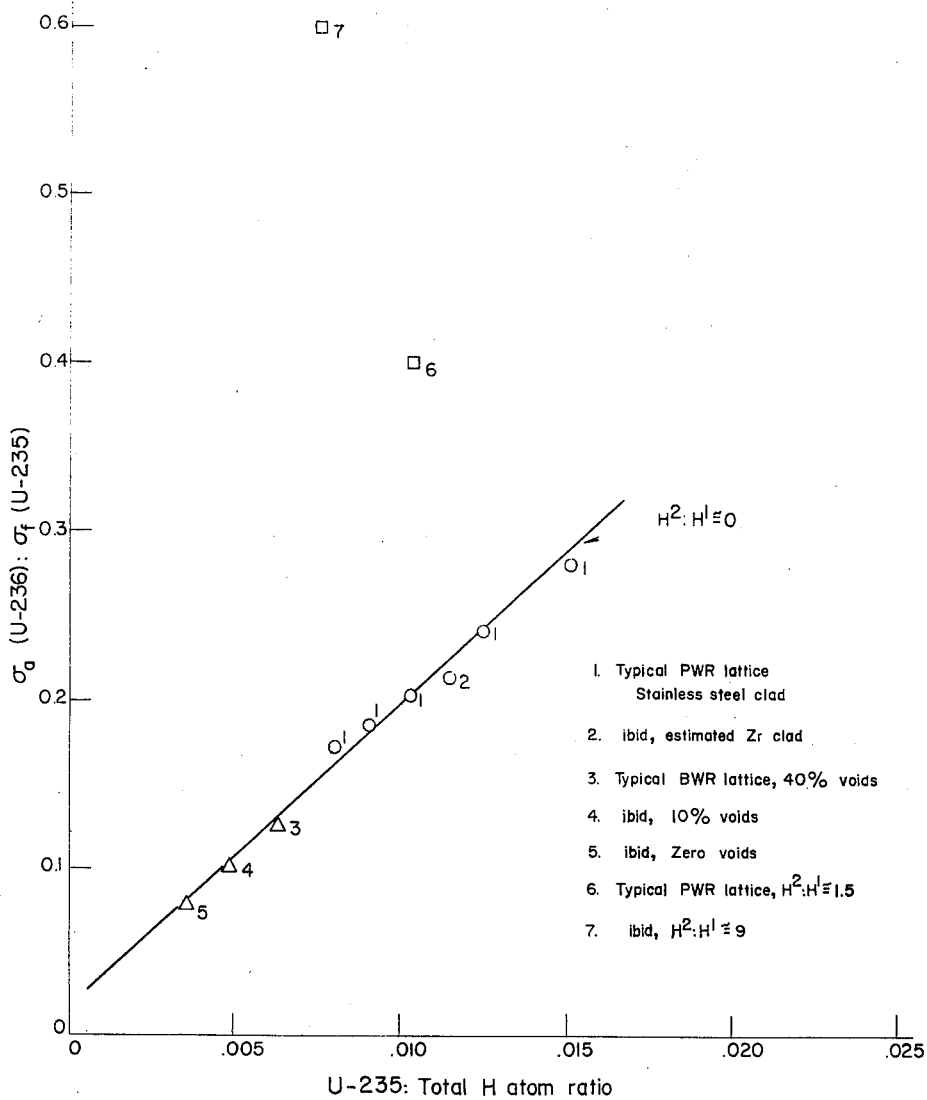

3,503,848
METHOD FOR THE CONCENTRATION OF U-236 IN ENRICHED URANIUM FUELS AND FOR MORE EFFICIENT UTILIZATION THEREOF
Jackson Arthur Ransohoff, Bethesda, Md., and Phillip McKenjie Wood, Pittsburgh, Pa., assignors to Neutron Products Inc., Washington, D.C., a corporation of Delaware
Continuation-in-part of application Ser. No. 247,339, Dec. 26, 1962. This application Nov. 9, 1964, Ser. No. 409,922
Int. Cl. G21g 1/00; G21c 19/20
U.S. Cl. 176—16          11 Claims This application is a continuation-in-part of our prior application, Ser. No. 247,339, filed Dec. 26, 1962, now abandoned.

This invention relates generally to methods for recycling nuclear reactor fuels, initially enriched in U-235, which have previously been irradiated and more particularly, to efficient management of the U-236 contained in such fuels as the result of radiative neutron capture in U-235.

U-236 captures a neutron to produce Np-237 in accordance with the following reaction:

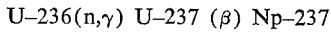
U-236(n,γ) U-237 (β) Np-237

Np-237 is naturally produced, incidental to the irradiation of natural and slightly enriched uranium, by the above reaction and by the (n,2n) reaction of fast neutrons on U-238 followed by the subsequent beta decay of U-237 to Np-237. Due to the low initial concentration of U-236 (it is naturally zero), its slow buildup, and the extremely low cross section for the (n,2n) reaction on U-238, the yield of Np-237 is normally low, and it is considered to be a scarce material.

Np-237 may find use directly in specific applications, or it may be of interest as an intermediate raw material for the production of Pu-238 by the reaction:

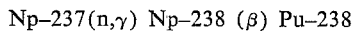
Np-237(n,γ) Np-238 (β) Pu-238

Pu-238 can be useful as a heat source for remote isotopic power devices, and can have applications in other areas of nuclear technology. Heretofore, this isotope has been costly and not readily available, due, at least in part, to the shortage of Np-237.

In the operation of nuclear power reactors, the gradual buildup of U-236 in the enriched fuels employed therein has been looked upon heretofore as a contaminent and has been considered a negative factor in power reactor economics. (See ORNL 60-4-79, "A Study of the Fuel Value of U-233," Jaye, Bennett & Lietzke, Apr. 11, 1960.) Even where the potential constructive effect of U-236 buildup upon Np-237 production has been recognized (See Arnold, "Effect of Uranium Recycle," Nuclear Science and Engineering, vol. 3, No. 6, June, 1958, pp. 707–725) prior art practices do not provide practical means for effecting its efficient retention. Rather, prior art techniques prescribe the subjecting of irradiated fuel to isotopic separation, even in conjunction with the processing of previously unirradiated fuels, a treatment whereby the U-236 content is neither most effectively diminished nor increased. In fact, appreciable thought and effort have been devoted to consideration of more complex methods of operating isotope separation plants so as to provide for even greater dilution or removal of U-236 in the waste than normally would be achieved; and the isotopic processing of previously irradiated fuels wherein the U-236 content of the irradiated fuel is diluted, has been both practiced and widely contemplated. (See "The U-236 Problem in the Combined Operation of Nuclear Power Reactors and Isotope Separation Plants," Garrett and Levin, Session 146–1958 Geneva Conf. P 442.)

By contrast, the present invention discloses methods for the deliberate retention of U-236 in irradiated nuclear reactor fuels to provide for the concentration, in useful or recoverable form, of the potentially valuable U-236 isotope. Further application of the teachings of the present invention results in improved yields of Np-237 and Pu-238 as potentially valuable by-products of power reactor operation, and in the absence of a demand for Np-237, in the efficient retirement from the fuel cycle, with minimum negative effect, of such U-236 as is produced as a consequence of enriched fuel irradiation.

It is a principal object of the present invention to provide methods for recycling previously irradiated slightly enriched reactor fuels, in a manner which enhances the production of Np-237 as a result of subsequent irradiations, while at the same time providing for increase of the U-236 contained therein.

It is another object of the present invention to provide methods whereby the U-236 content of enriched U-235 fuels can be concentrated and efficiently retired from the fuel cycle in uranium of little other value, while at the same time providing for the incidental and inexpensive production of significant quantities of Np-237.

A further object of the present invention is to prescribe methods whereby the continued irradiation of previously irradiated highly enriched uranium can be performed to provide an unusually high yield of Np-237 and Pu-238.

The terms "enriched" or "enrichment" as used herein refer to the U-235 content of uranium fuels ordinarily employed in nuclear reactors. Uranium of natural enrichment has a U-235 content of about 0.7%. Fuel of a U-235 content below 0.7% is called depleted. Fuel with a U-235 content between 0.7% and 1.5% is of "low enrichment." Fuel having a percentage of U-235 to U-235+ U-238 of from about 1.5% to about 20% is defined here as "slightly enriched" and fuel having a percentage of U-235 U-235+U-238 of between 20% and 93% is defined as "highly enriched." Fuels having a U-235 content in excess of 93% are designated "very highly enriched." "Power reactor" as used herein means those nuclear reactors designated to give heat energy which is inherently useful as a source of heat, or which can be transformed into other useful energy forms, such as electrical energy, by turbine driven generators and the like.

In order to appreciate the teachings of the present invention, it is helpful to consider the neutron absorbing properties of U-236. U-236 has a low cross section (~6 barns) for the capture of neutrons of thermal (approximately .025 ev.) energy. However, its capability of capturing epithermal neutrons is appreciable as its infinite dilution resonance integral equals approximately 300 barns. Thus, U-236 is an extremely effective neutron absorber in a hard spectrum thermal reactor (where a significant fraction of the fissions are caused by neutrons above thermal energy) but is a very mild absorber in soft spectrum thermal reactors (where a realtively small fraction of the fissions are caused by epithermal neutrons). In general, the higher the ratio of U–235 to moderator, (hydrogen in the case of water moderated reactors) the harder the neutron spectrum, and the higher the effective U–236 cross section. To illustrate, the figure shows the ratio of the capture cross section of U–236 to the fission cross section of U–235 as a function of the U–235:H ratio in several practical power reactors. The circled points represent various pressurized water power reactor fuel-to-moderator ratios, and the triangles are representative of boiling water power reactors. The squares will be discussed subsequently.

Methods for the constructive concentration of U–236 in slightly enriched fuels

Consider, for example, operation of a slightly enriched power reactor, having a relatively hard thermal neutron spectrum, such as the Yankee reactor at Rowe, Mass. Under practices contemplated by prior art, the fuel, after being irradiated and recovered by chemical processing, could be reenriched to the required U–235 content by general isotopic separation, but in the process, considerable U–236 would be lost in the waste and spread among other fuels. Should the market for Np–237 be depressed, this would be unfortunate since the undesirable U–236 would be spread through the general fuel inventory. Should the demand for Np–237 be attractive, this would be equally unfortunate, since subsequent irradiation and utilization of the U–236 originally contained would be diffuse and unimportant. At appreciable expense, the U–235 content of the irradiated fuel could be raised to a level which would permit recycle in the Yankee reactor by blending with highly enriched fuel, but this would be expensive due to the cost of degrading the more highly enriched fuel. In accordance with the teachings of the present invention, in the event of a substantial Np–237 demand, the irradiated fuel could be reenriched at comparable expense by addition of sufficient previously irradiated highly enriched fuel to provide the enrichment required for a subsequent irradiation of the desired duration, while at the same time increasing the U–236 content further and enabling greater Np–237 production. The U–236 content could be increased even further and more rapidly by reenriching with previously irradiated highly enriched fuel which has been further enriched in U–236 by virtue of several irradiations or isotopic separation. The irradiation, processing, and reenrichment cycle can then be repeated as many times as desired to effect a continued increase of U–236 content and Np–237 production. The choice of fuel for reenriching is of course governed by the availability of previously irradiated highly enriched fuels, and of course by economic factors.

For a given core life in a given reactor, an additional incremental increase in enrichment, in order to maintain criticality and operability of the reatcor, will be required for the recycle of slightly enriched fuel in this manner, the size of the increase depending (all other factors being equal) on the U–236 content in the fuel as prepared for recycle.

The concentration and retirement of U–236 by cascading of slightly enriched fuels It is recognized that the demand for Np–237 may not be such as to encourage the expense of increasing production in slightly enriched fuels by concentrating U–236 in fuels for use in relatively hard spectrum reactors as hereinbefore described. In such circumstances, it would be desirable to eliminate U–236 from the general inventory with minimum adverse effect, and yet commendable to continue to concentrate the U–236 contained and produced so as to render it potentially recoverable or usable at some future date while still producing modest quantities of Np–237 at normal expense.

In accordance with these goals, the continued irradiation of slightly enriched fuels which have been previously irradiated can be accomplished in a manner which provides for continued retention, buildup, and retirement of the U–236 contained therein. This can be achieved with somewhat less Np–237 yield but at nominal expense, in reactor cores designed to operate on fuels of lower enrichment than required for the initial irradiation. After being processed, refabricated and irradiated in a second reactor core requiring a lower enrichment than the first, the fuel can, if above natural enrichment, be reprocessed, refabricated and reirradiated again in a third core designed for a fuel of even lower enrichment than the second core, and so on. The continued irradiation of slightly enriched fuel in cores requiring successively lower enrichment can be accomplished by changing the site of irradiation to a reactor requiring fuel of a lower enrichment, or perhaps even in the same reactor if a lower enrichment becomes optimum by a change in cladding material from stainless steel to zirconium, for example.

The irradiation cascade can be continued economically until the U–235 content of the fuel is depleted below natural enrichment by adding another fissile material such as Pu, for added reactivity, or by using the cascaded fuel in conjunction with higher reactivity fuel spikes as in the banket region of seed and blanket reactors, or by performing the final irradiation in the reactor in which the irradiation normally depletes the fuel to that extent. Once the fuel has been depleted by successive cycles of processing, fabrication, and irradiation until it is of little value, it can be retired from further use, and in the process, the contained U–236 would also be retired, but in a concentrated form which would enable recovery or further recycle at some future date if that proved desirable.

The operability of cascading is not dependent upon the final enrichment from one irradiation being precisely that required for a subsequent irradiation, but rather it is contemplated that the reactivity will be adjusted to one which is suitable by the addition of Pu, e.g., or by blending with modest amounts of other enriched fuels. By this technique, the end product of an irradiation cascade would be a fuel having a U–235 content below natural, while being upgraded at little if any added expense in U–236 content so as to contain four to six kilograms of U–236 per ton. Meanwhile, modest additional quantities of Np–237 would be produced in the reactors used for recycle for little more than the cost of the neutrons captured.

It is also contemplated that the cascading process be used in conjunction with the fuel reenrichment process previously described for increasing the efficiency of Np–237 production in slightly enriched fuels. For example, an attractive market for Np–237 might encourage the operator of a reactor, such as that at Rowe, Mass., to increase the U–236 content of its fuel. Subsequent market conditions could make the continued practice of this method of U–236 recycle less economic, however, than cascading of the higher-than-normal U–236 content fuel through reactors of successively lower enrichment so as to decrease the effect of the U–236 thereby to produce lesser quantities of Np–237 at lower incremental cost, and provide for further concentration of the U–236 in fuel of little other value.

Conversely, market conditions might make it attractive for the initially more highly enriched fuel to be cascaded through reactors of lower enrichment. Subsequent events could then encourage substantial reenrichment of the fuel to enable continued recycle in an environment which would enhance Np–237 production.

Increasing the U–236 content of highly enriched fuels

The practical availability of previously irradiated highly enriched fuels is assured by the irradiation of considerable quantities of such fuels in military and test reactors, in the seeds of reactors such as that at Shippingport, Pa., etc. The U–236:U–235 ratio of substantially irradiated uranium fuels will vary, depending upon the degree of burnup, between .05 and approximately 0.2. The U–236 content can be further increased, either by isotopic enrichment, or by successive irradiations. If a once-irradiated highly enriched fuel with a U–236:U235 ratio of 0.1, for example, were recycled so as to effect a 35% burnup of the remaining U–235, the U–236:U235 ratio of the resulting twice-irradiated fuel would be increased to approximately 0.25; and subsequent recycle would still further increase the U–236:U–235 ratio of the fuel. In many of the softer spectrum highly enriched reactors, such as the Materials Testing Reactor (MTR) or the Engineering Test Reactor (ETR), for example, the recycle of once- or even twice-irradiated fuel would present little cost or inconvenience, particularly if such fuels were standardized with regard to U–236 content. Therefore, a substantial quantity of highly enriched fuel which would contain several hundred grams of U–236 per kilogram of U–235 could be produced readily at little expense by establishing a standard U–236 content for irradiated enriched fuels at some level on the order of 100 grams U–236 per kilogram U–235, for example, and using such fuels in certain research and test reactors, and the like. Such fuels could be blended with previously irradiated slightly enriched fuels to facilitate their recycle and to remove U–236 from the highly enriched fuel inventory at minimum expense. Or they could be irradiated, without degradation in enrichment, in a harder spectrum to facilitate Np–237 production.

Alternatively, previously irradiated fuel could be processed in an isotopic separation plant which would yield two product streams: one, a fuel of U–236:U–235 ratio significantly higher than the feed, and the other, a fuel with a U–236:U–235 ratio lower than the feed. The feed to such a plant could be once-irradiated enriched fuel, or it could be fuel which has increased U–236 content by virtue of several irradiations.

For instance, for the preparation of high U–236 content fuel to be used for reenriching previously irradiated slightly enriched fuel, two grades of highly enriched fuel could be established: (1) unirradiated, and (2) irradiated with a U–236:U–235 ratio on the order of about 0.1, for example. In such a case, feed to the isotope separation plant, produced by irradiation of the U–236 containing fuel, would contain about 250 grams U–236 per kilogram U–235; one product from the plant may contain perhaps 100 grams U–236 per kilogram U–235 for recycle in soft spectrum reactors, and the other product perhaps 500 grams U–236, or even more, per kilogram of U–235. The optimum U–236 and U–238 contents of the product streams would reflect economic conditions, but in general, one would expect the depleted (In U–236) fuel to be even more depleted in U–238, and vice versa. Such a plant would best be one that did not concurrently process previously unirradiated fuel and many variations are possible, but in any event, a relatively modest isotope separation effort could be designed to produce two useful products for U–236 control and Np–237 production: a relatively high U–236 content enriched fuel; and a high purity (with respect to U–238) U–235 fuel, also containing appreciable quantities of U–236.

As in the case of fuel enriched in U–236 by multiple irradiations, the high U–236 content product fraction can be constructively used in other ways, thereby providing for the effective removal of substantial U–236 from the inventory of highly enriched fuels used in research and test reactors and the like. It can be blended with previously irradiated, slightly enriched power reactor fuel, thereby increasing the U–236 content of said slightly enriched fuel much more rapidly than otherwise be the case. Here, as has been noted previously, the harder neutron spectrum provided by certain power reactors provides an environment for relatively economical transformation of the U–236 present to Np–237, and the ability to add additional U–236 to the slightly enriched fuel enhances its continued use in this environment.

Alternatively, such highly enriched fuel in which the U–236 content has been increased also could be irradiated in relatively hard spectrum power reactors, still in highly enriched form. The seeds of reactors such as the PWR at Shippingport, Pa., could provide such an opportunity, and in general, power reactor spikes or seeds may be considered possible sites for such an irradiation.

Alternatively, if the demand for Np–237 and Pu–238 were great enough, and with use of appropriate reactors, it would be desirable to operate the isotopic separation plant so as to concentrate U–236 in a highly enriched (in U–235) fuel relatively free of U–238. This would not normally be the product of the isotopic separation of previously irradiated highly enriched fuel, but it would be possible to operate a plant to produce such a product by adjusting the reflux ratios and product outlets; and a single recycle of the high U–235 fraction from the process described previously would provide a suitable product of this sort. In any event, the irradiation of said very highly enriched U–236 containing fuels in a highly epithermal neutron spectrum could provide for the greatly accelerated production of Np–237 and the direct production of product quality Pu–238 as is taught by the present invention. Behold!

Increasing the utilization of U–236 in water moderated reactors

First, reconsider the Yankee Reactor at Rowe, Mass., for example. If a substantial portion of the hydrogen (H–1) in the water were replaced with deuterium (H–2), the spectrum would be much harder since, even for a given ratio of U–235:H, the moderator effectiveness would be reduced. Retaining the same geometry and U–235 content as for the first Yankee core, but substituting thorium as the fertile material, and Zircaloy as the clad, one would require an initial H–2:H–1 ratio of about 1 to 1.5, assuming that the reactor were to be operated as a spectral shift reactor in the manner of Edlund. Under such circumstances, the ratio of the infinite dilution U–236 capture cross section and the U–235 fission cross section would be about 0.47. (See FIGURE 1, #6.)

During the course of the fuel cycle, as H–2 is replaced by H–1 to maintain criticality, the spectrum softens until at the end of life, the ratio of U–236 capture cross section to U–235 fission cross section is reduced to about 0.2 as in a pressurized water reactor. Nevertheless, the harder spectrum on the average results in the more efficient conversion of U–236 to Np–237 than in the same reactor using $H_2O$ as the coolant. Still a more epithermal spectrum would be desirable, moreover, for maximum Np–237 production.

Maintaining the Yankee lattice, the substitution of H–2 for H–1 in excess of that contemplated heretofore by such as Edlund, would increase the ratio of $\sigma_a$U–236:$\sigma_f$U–235 even further, but doing this would tend to decrease reactivity. Additional fuel could be added to compensate, but although the flux would be hardened further, which would be salutary for Np–237 production, this would also serve to decrease the magnitude of the flux, and this would in turn have a negative effect upon Np–237 production. However, in accordance with the present invention, the flux can be hardened substantially, while maintaining or even increasing its magnitude, to achieve an unusually attractive environment for the production of Np–237 and Pu–238 or for other purposes. This can be achieved by decreasing the quantity of fertile material in the core as contemplated by Edlund, thereby relieving the need for as much fuel to maintain reactivity. The fuel can be incorporated in cermet fuel elements for sustenance of the higher level of radiation damage which would be associated with the presence of substantially less fertile material, or alternatively, the displaced thoria could be replaced by a compatible structural material of low cross section such as zirconium oxide.

Then the deuterium/hydrogen ratio in the water can be increased to a value substantially greater than 1.5 while using no more fuel than the 700 kg. required for the reference case, and perhaps even less. This would result in a more epithermal spectrum of greater magnitude.

Using zirconia dilution, present Yankee core geometry, a deutrium/hydrogen ratio of 9.0, a fuel content of 500 kg., and a U–235:Th ratio of about 0.08, the infinite dilution capture cross section of U–236 is increased to approximately 0.6 times the U–235 fission cross section. (See FIG. 1 #7.)

Such a spectrum also increases the ratio of U–235 captures to fissions, and also enhances Np–237 production. Comparing the operation of the Yankee reactor on its Core 2 fuel, on spectral shift approximately in the manner of Edlund, and on the further hardened spectrum defined above, for a fuel initially free of U–236, the production of Np–237 for a 12,500 full power hour irradiation (approx. 16,000 mwd./t.) would be approximately 3, 5.5, and 10 kg. respectively. The effective U–236 cross section ratio decreases of course, due to self-shielding for high concentrations of U–236, but even so, the recycle of U–236 in the further hardened and intensified spectrum provides for a spectacular improvement in Np–237 production. For example, it is estimated that for the hard spectrum fuel cycle discussed above, if the fuel were to contain 200 kg. U–236, it would yield, also for an irradiation of 12,500 full power hours, about 32 kg. of Np–237, compared with a yield of less than 15 kg. for use of a similar U–236 content in a normal Yankee core.

The direct production of Pu–238

Of perhaps equal significance, in view of the teachings of the present invention, is the fact that the harder spectrum provided by the substantial substitution of deuterium for hydrogen in a water moderated reactor also provides for increasing the Np–237 cross section relative to that for the fission of U–235. As a result, a considerable fraction of the Np–237 poduced may undergo further transmutation to Pu–238. In the case cited immediately above, for example, 9 kg. of Pu–238 are produced. If fuel with greater than 7% U–238 were used, as would normally be the case, the Pu–238 produced would not be a product of quality due to the presence of higher Pu isotopes resulting from neutron captures in U–238. This is not terribly serious in the case where unirradiated fuel is used since the production of Pu–238 is modest in any event. However, for the recycle of previously irradiated enriched fuel, a reduction in U–238 content from that which would normally be present is most desirable. In the case cited above, for example, the estimated Pu–238 isotopic purity would be about 85% if the U–238 content were on the order of 1%, but only about 65% if the initial U–238 content were 7%, for example.

Accordingly, although this has not been contemplated in the past, one would, in order to achieve good product quality, and in accordance with the teachings of the present invention, (1) introduce previously irradiated highly enriched fuel to isotopic separation to increase, or at least maintain, its U–236 content and decrease its U–238 content to substantially less than 7%; and (2) subject said fuel to further irradiation in a reactor environment in which the spectrum hardness was greater than would be achieved with a U–235:H atom ratio of 0.012, for example.

Summarizing the teachings of the present invention, it is quite practical to reuse previously irradiated enriched uranium without recourse to disposal of part of the U–236 in enrichment plant waste or dilution by mixture with previously unirradiated fuels. Rather, various methods are prescribed for eliminating U–236 from the general fuel inventory by concentration in certain fuels which can be recycled either to maximize Np–237 production, or to minimize the effect of U–236 as the fuel is depleted and retired.

The amount of Np–237 produced by practice of the present teachings is dependent upon the particular method used for recycling the U–236 produced in the reactor complex. In the case of the slightly enriched fuels, U–236 will be concentrated in fuels for use in softer spectrum reactors, preferably of lower specific power, should the demand or price for Np–237 appear low or modest, and in fuel for harder spectrum reactors, preferably of higher specific power, should the demand and price for Np–237 be high enough to warrant. In no event, however, is it contemplated that fuels of higher than natural enrichment be subjected to isotope separation in conjunction with the processing of substantial quantities of previously unirradiated fuels as contemplated by prior art. Rather, in accordance with the present teachings, U–236 may be subsequently reclaimed from fuel of below natural enrichment by isotopic separation not in conjunction with the substantial concurrent processing of unirradiated fuels.

The Np–237 produced in the course of practicing the present methods for U–236 recycle, conveniently can be recovered from the irradiated fuel after each irradiation during the course of fuel processing.

The following examples will serve to further describe the present invention by illustrating further some of the contemplated methods of operation, but are not meant to limit it thereto:

Example 1

Consider a commercial pressurized water power reactor having construction and operating parameters similar to that of the Yankee Reactor at Rowe, Mass., operating on uranium fuel initially enriched to about 4.2 percent, and having an average effective fuel lifetime of about 15,000 megawatt days per ton at a reactor power level of about 580 megawatts thermal. Present plans for operation contemplate the irradiation of the core by fractions, with a new fraction added to the reactor periodically, replacing the oldest fraction, with the last new fraction remaining in the reactor. Consider operation, by half cores wherein each half core of fuel is used for two years with a half core replaced each year, and allowing a year out of pile for cooling, shipping, processing, reenrichment and refabrication. This fuel cycle, which is somewhat simplified for purposes of illustration, could be employed in actual operation to retain the U–236 produced in the fuel and provide for the production of substantial quantities of Np–237 therein. In this cycle, the first core, after irradiation, is removed from the reactor and fuel from half of this core is reenriched by the addition of highly enriched U–235 which may or may not have been previously irradiated and enriched in U–236. The reenriched half core of fuel is returned to the reactor at the start of the third year of operation as the first half of the third core. The fuel from the first half of the second core is removed after irradiation, processed, similarly reenriched, and inserted back into the reactor as the second half of the third core at the end of the third year of operation. Fuel from the second half of the second core which is removed at this time is processed, reenriched and reinserted into the reactor as the first half of the fourth core. Thereafter each half core is removed from the reactor, procesed, the fuel reenriched by blending, and refabricated for insertion into the reactor, approximately one year after its removal, as half of a subsequent core.

TABLE I

| U-236/U-235 Ratio (1) Reactor half core | | | | | | | | | | | | | | | | | |
|---|---|---|---|---|---|---|---|---|---|---|---|---|---|---|---|---|---|
| From Reactor as— | Returned to Reactor as— | 0.0 | | | | 0.1 | | | | 0.2 | | | | 0.5 | | | |
| | | Eo(2) | Uo(3) | UF(4) | Np(5) | Eo | Uo | UF | Np | Eo | Uo | UF | Np | Eo | Uo | UF | Np |
| 1 1 | 3 1 | 4.2 | 1.2 | 3.6 | 1.6 | 4.3 | 2.8 | 5.2 | 2.5 | 4.3 | 4.4 | 6.8 | 3.2 | 4.6 | 10.2 | 12.3 | 5.7 |
| 2 1 | 3 2 | 4.2 | 1.6 | 4.0 | 1.8 | 4.3 | 3.2 | 5.6 | 2.7 | 4.4 | 5.0 | 7.3 | 3.5 | 4.6 | 10.6 | 12.7 | 5.9 |
| 2 2 | 4 1 | 4.2 | 2.4 | 4.8 | 2.3 | 4.3 | 4.0 | 6.4 | 3.0 | 4.5 | 6.0 | 8.3 | 4.0 | 4.7 | 12.0 | 13.9 | 6.3 |
| 3 1 | 4 2 | 4.3 | 3.6 | 6.0 | 2.9 | 4.5 | 6.9 | 9.1 | 4.3 | 4.6 | 10.4 | 12.5 | 5.8 | 4.9 | 20.9 | 22.4 | 9.7 |
| 3 2 | 5 1 | 4.3 | 4.0 | 6.4 | 3.0 | 4.5 | 7.3 | 9.5 | 4.4 | 4.6 | 10.7 | 12.8 | 5.9 | 4.9 | 21.5 | 23.0 | 9.8 |
| 4 1 | 5 2 | 4.4 | 4.8 | 7.1 | 3.4 | 4.5 | 8.1 | 10.2 | 4.7 | 4.7 | 11.7 | 13.6 | 6.2 | 4.9 | 22.0 | 23.5 | 10.0 |
| 4 2 | 6 1 | 4.5 | 6.0 | 8.3 | 4.0 | 4.6 | 10.7 | 12.8 | 5.9 | 4.8 | 15.9 | 17.7 | 7.8 | 5.3 | 31.2 | 32.5 | 13.8 |
| 5 1 | 6 2 | 4.5 | 6.4 | 8.7 | 4.2 | 4.6 | 11.1 | 13.1 | 6.0 | 4.8 | 16.2 | 18.0 | 7.8 | 5.4 | 32.0 | 33.0 | 14.2 |

(1) Ratio of U-236/U-235 in highly enriched fuel used for reenriching.
(2) Initial enrichment, % U-235 in reenriched half core.
(3) Uo—Initial U-236 content, kg./T. in reenriched half core.
(4) UF—Final U-236 content, kg./T.
(5) Kg Np-237 produced per half core, by the U-236 (n, γ) reaction.

Table I summarizes the estimated results of a number of such recycles showing the build-up of U-236 and the production of Np-237 in the reenriched and recycled fuel as a function of the ratio of U-236/U-235 in the fuel used for reenriching. Each line represents one calendar year of operation at 580 mw.(th) and a plant factor of 0.74.

Operation of a fuel cycle such as that described above would result in increased annual fuel cycle costs estimated to be approximately $200,000 initially, and approximately $500,000 as the U-236 content of the fuel is increased to about 20 kg. per ton. Depending upon the U-236 content of highly enriched fuels for reenriching, the by-product Np yield of the reactor operating on this type of fuel cycle could be increased more or less markedly, and the attractiveness of such operation would of course depend upon the market for Np-237.

It is noted that the principal increased cost initially associated with the fuel cycle described above is that which results from the degradation of substantial quantities of highly enriched fuel in the blending operation, and simple reenrichment, by blending with highly enriched fuels would, except in very unusual circumstances, prove unattractive. However, for about the same fuel degradation cost, the use of previously irradiated highly enriched fuel for reenrichment by blending could provide enough additional income by virtue of the additional Np-237 produced to make this method of retaining and concentrating U-236 practical.

In addition to the increased yield per unit of fuel degradation expense, the use of previously irradiated fuel for reenriching has the added advantage of decreasing the period of risk required to increase the U-236 content to the point where its continued use would produce economically attractive yields of Np-237. Here again, this innovation in U-236 management could provide the incentive to proceed with the constructive concentration of U-236 in slightly enriched uranium fuels where that might not otherwise be attractive.

The absence of an adequate demand for Np-237 coupled with the existence of reactors capable of operating on fuels of lower enrichment can create conditions whereby it would be preferable to concentrate U-236 and produce lesser quantities of Np-237 at lower cost by cascading in a fuel cycle complex such as that described in Example 2.

Example 2

Extend consideration of the continued use of irradiated fuel from a reactor such as that cited above. Following one irradiation, the fuel would have an enrichment on the order of 2.7 to 3 percent U-235 and would contain about 2.5 kilograms U-236/ton.

This irradiated fuel could be recycled in the same reactor, or a reactor having a similar spectrum, without reenrichment by adding substantial Pu to provide sufficient reactivity in the fuel; or alternatively, after only slight reenrichment, that is less than 5 kg. U-235 per ton, if the cladding material were changed from stainless steel to zirconium for example, or if some other change were made such that a lower initial enrichment would be satisfactory. Also, continued recycle in a pressurized water spectrum could be accomplished at the expense of little or no reenrichment by use in the inner zone of a new multi-zoned core such as that planned for Core B of the Consolidated Edison Reactor at Indian Point, N.Y. or the Connecticut Yankee Reactor at Haddam Neck, Conn., etc. In either case, the efficiency of conversion of U-236 to Np-237 would be comparable to that realized by the method of recycle described in Example 1, and subsequently the recycle could be continued as in Example 1.

If it were desired to decrease the effect of the presence of U-236 upon the fuel cycle, however, the fuel could be recycled in reactors with larger diameter fuel pins and a softer spectrum such as a Boiling Water Reactor like those at (1) Humboldt Bay (Calif.), (2) Big Rock Point (Mich.) or (3) Dresden (Ill.), or those contemplated for Bodega Bay (Calif.) or Oyster Creek (N.J.). Little, if any, increased enrichment would be required, since these reactors require a lower enrichment than the pressurized water reactors for economic operation, and in fact it may be desirable to reduce the enrichment by blending with previously irradiated fuel of lower enrichment. Such a subsequent irradiation would provide a burned out fuel of about 0.8 to 1.5 percent enrichment and a U-236 content of about 4 kilograms per ton.

After processing and appropriate refabrication, the irradiated fuel could be irradiated again in a spiked reactor, or as the blanket of a seed and blanket reactor such as that at Shippingport, Pa., or in a reactor using a lower cross section moderator, such as the NPR at Richland, Wash., or the CANDU reactor at Douglas Point, Ontario, etc., or in another boiling reactor by adding Pu to the fuel for added reactivity. In any event, the U-235 content after such an irradiation would be decreased below natural enrichment while the U-236 content of the fuel would rise to around 5 kilograms per ton. In this manner, U-236 is gradually but effectively concentrated and irradiated in reactors of successively softer neutron spectra, where, for a given enrichment, the poison effect of U-236 is less severe, while at the same time providing for significantly increased production of Np-237. In Dresden, for instance, the use of fuel containing 2.5 kg. U-236/t. would require an enrichment less than 0.1 percent higher than would be required for clean fuel, and could result in the production of about 2.7 kg. of Np-237 per 10 ton zone for a 15,000 mwd./t. life versus about 1.4 kg. per 10 ton zone for the irradiation of clean fuel.

If the market for Np-237 were nil or effectively satisfied, the depleted fuel resulting from the cascading described could be disposed of or readily stored pending a change in market conditions. Meanwhile, U-236 would have been effectively removed from the complex of operating power reactors in fuel having little if any other value. If, however, the market for Np-237 were to become more attractive, and if economic conditions warranted, the spent fuel from any step could be reenriched for recycle in more efficient reactors for Np-237 production, or the depleted fuel could be subjected to isotopic separation for its U-236 content, with U-235 being the by-product. It is anticipated that such a separation could be performed in a small special purpose plant and that the isotopic separation process would be performed in the absence of fuels containing little or no U-236.

A further alternative is available for the continued recycle of slightly enriched fuel in boiling water reactors. Note from FIGURE 1 that the higher the void fraction, the more efficient the utilization of U–236. Accordingly, fuel may be recycled in a boiling water reactor: (a) with the U–236 uniformly dispersed; (b) with the fuel in the upper portion of the fuel bundle containing a higher proportion of U–236 than the fuel in the lower portion of the fuel bundle in order to enhance Np–237 production; (c) the reverse of (b) in order to minimize Np–237 production.

Example 3

Consider now the continued use of highly enriched uranium which has been previously irradiated and processed and is available for continued recycle. By applying prior art, this fuel would be subjected to isotopic separation and the U–236 contained distributed among other fuels being processed simultaneously. By practicing the teachings of the present invention, however, this fuel would be processed by one of the following methods:

(3a). It could be blended with previously irradiated slightly enriched fuel in order to raise the enrichment of that fuel to enable it to be recycled in a reactor wherein the conversion of U–236 to Np–237 would be efficient;

(3b). It could be fabricated into a suitable form and recycled in its highly enriched state so as to increase the U–236:U–235 ratio in said fuel and provide for some increase in the incidental production of Np–237;

(3c). It could be subjected to isotopic separation wherein at least one product stream would have a U–236:U–235 ratio higher than that of the feed; and wherein the U–238 contained would be concentrated in the high U–236 fraction; or (3d). It could be subjected to isotopic separation wherein the U–236:U–235 ratio would be maintained in one fraction substantially as in feed, or increased, and the U–238:U–235 ratio in that fraction would be less than .05.

The fuel resulting from treatment in the manner of (3a) is discussed further in Examples 1 and 2. Further treatment of the fuel processed in the manner of (3b) may be handled in accordance with the manner prescribed in either (3a), (3c) or (3d) above, or it could be recycled in a harder spectrum than the initial irradiation for increased Np–237 production. The product of treatment in the manner of (3c) having a higher U–236:U–235 ratio than the feed could be further used as prescribed in (3a) or (3b).

The secondary product of (3c), having a lower U–238:U–235 ratio than the feed, and the product of treatment described in (3d) having a U–236:U–235 ratio comparable to, or higher than that in the feed, and having a U–238:U–235 ratio lower than 0.05, could be processed further as under (3b): but preferably, it would be subjected to further irradiation in a manner which would more substantially increase Np–237 production and enhance production of product quality Pu–238 as well.

Minimum satisfaction could be realized by performing the subsequent irradiation in a flux at least as epithermal as that which would be created by a U–235:H of ratio of 0.012 as is characteristic of the initial seeds of the Shippingport reactor for example. Following the more advanced teachings of the present invention, a more desirable spectrum for this purpose would be at least as epithermal as that which would be produced by a U–235:hydrogen ratio equal to or greater than .01, wherein the ratio of H–2 to H–1 within the hydrogen would be on the order of 1.0 initially; and most satisfaction would be realized by irradiating said fuel for substantially improved Np–237 and Pu–238 yield in a flux further enhanced in both the hardness and, for a given power density, the magnitude of the flux, by using a U–235:hydrogen ratio less than .01 and achieving the desired hardness by initially using a H–2:H–1 ratio of 4 or more.

Thus, even in the continued utilization of previously irradiated highly enriched fuel, it is desirable and advisable to practice the deliberate concentration and recycle of the U–236 contained rather than the deliberate dispersal and dilution, and it is noted further that it is desirable and feasible, as in the case of slightly enriched uranium, by appropriate choice of method, to direct such recycling either to the increased production of Np–237 or to a decreased poison effect of the U–236 contained.

Various modifications can be made in the present invention without departing from the spirit or scope thereof, for it is understood that we limit ourselves only as defined in the appended claims.

What is claimed is:

1. A process for concentrating U–236 in U–235 containing nuclear reactor fuels and for preparing Np–237 which comprises:
    (1) irradiating in a nuclear reactor fuel elements containing uranium fuel highly enriched in U–235, thereby increasing the U–236 content of said fuel;
    (2) subjecting said irradiated fuel to further processing to provide a fuel with a higher ratio of U–236 to total uranium fuel atoms;
    (3) recycling the fuel so enriched in U–236 for further irradiation in a nuclear reactor having a neutron spectrum more epithermal than that provided by a U–235:H ratio of .01; and
    (4) recovering the Np–237 produced during the latter irradiation and any subsequent irradiations.

2. A method as defined in claim 1, wherein the further processing of step (2) includes isotopic separation.

3. A method as defined in claim 1, wherein the further processing of step (2) includes re-irradiation.

4. A process for producing substantially increased yields of Np-237, and Pu–238 of product quality comprising:
    (1) providing a fuel having a U-238:U–235 ratio less than .05;
    (2) irradiating said fuel in a neutron environment, wherein the neutron spectrum is more epithermal than that provided by a U–235:H ratio of .01;
    (3) continuing said irradiation until at least 20% of the U–235 atoms initially in the fuel are consumed; and
    (4) recovering the Np–237 and Pu–238 by chemical processing.

5. A process as described in claim 4, wherein the fuel also contains appreciable U–236.

6. A process as described in claim 4, wherein the initial neutron spectrum is more epithermal than that which would be provided by a U–235:H ratio of .01, wherein the H–2:H–1 ratio is greater than 1.5.

7. A process as described in claim 4, wherein the initial U–235:H ratio is less than .01, and wherein the spectrum is maintained more epithermal than that provided by a U–235:H ratio of greater than .01 by the substantial substitution of D for H.

8. A method for concentrating U–236 and increasing the yield of Np–237 which comprises:
    (1) preparing a fuel bundle for a boiling water reactor wherein the U–236 content of one portion along the length of the bundle is substantially higher than the average U–236 content of the bundle,
    (2) irradiating said bundle so that the portion containing the higher U–236 content is in the upper portion of the boiling water reactor core.

9. A method for concentrating U–236 and minimizing the poison effect of U–236 which comprises:
    (1) preparing a fuel bundle for a boiling water reactor wherein the U–236 content of one portion along the length of the bundle is substantially higher than the average U–236 content of the bundle,
    (2) irradiating said bundle so that the portion containing the higher U–236 content is in the lower portion of the boiling water reactor core.

10. A process for concentrating U-236 in U-235 containing nuclear reactor fuel and for preparing Np-237 and Pu-238 in good yield and in good quality which comprises:
  (a) irradiating in a nuclear reactor fuel elements containing uranium fuel highly enriched in U-235 thereby increasing the U-236 content of said fuel;
  (b) recovering said irradiated fuel by chemical processing;
  (c) subjecting said irradiated fuel to isotope separation processing to retain in one fraction a major fraction of the U-236 produced in the irradiation of step (a) and decrease the U-238 content of that fraction to less than 5% of the total uranium atoms;
  (d) subjecting the fuel so depleted of U-238 to further irradition in a nuclear reactor and in a flux more epithermal than that provided by a U-235 to H-1 ratio of 0.01;
  (e) recovering the Np-237 and Pu-238 produced during the latter irradiation and any subsequent irradiations.

11. The process of claim 10 wherein the U-235 to total hydrogen ratio is less than 0.01 and the H-2 to H-1 ratio exceeds 1.0.

References Cited

UNITED STATES PATENTS

| | | | |
|---|---|---|---|
| 2,856,337 | 10/1958 | Untermyer | 176—30 |
| 3,103,475 | 9/1963 | Szilard | 176—16 |
| 3,208,912 | 9/1965 | Jaye et al. | 176—16 |
| 3,081,246 | 3/1963 | Edlund | 176—18 |
| 3,087,779 | 4/1963 | Johnson et al. | 23—324 |

OTHER REFERENCES

Arnold, Effect of Uranium Recycle; Nuclear Science and Engineering, vol. 3, No. 6, June 1958, pp. 707–725.

Flagg, General Features of Nuclear Fuel Processing; Chemical Processing of Reactor Fuels, 1961, p. 4.

AEC Document HW-69027, 1961, pp. 2–4.

AEC Document, HW-71812, January 1962, p. 4.

AEC Document ASAE-5-8, 1958, pp. 3, 4 and 14.

Pigford et al. Second U.N. Conference on Peaceful Uses of Atomic Energy, vol. 13, 1958, p. 209.

CARL D. QUARFORTH, Primary Examiner

H. E. BEHREND, Assistant Examiner

U.S. Cl. X.R.

176—30